United States Patent [19]

Quella et al.

[11] 4,426,368
[45] Jan. 17, 1984

[54] METHOD OF PRODUCING GLASS CARBON

[75] Inventors: Ferdinand Quella, Gauting; Hans-Friedrich Schmidt, Eurasburg, both of Fed. Rep. of Germany

[73] Assignee: Siemens Aktiengesellschaft, Berlin & Munich, Fed. Rep. of Germany

[21] Appl. No.: 461,982

[22] Filed: Jan. 28, 1983

[30] Foreign Application Priority Data

Mar. 24, 1982 [DE] Fed. Rep. of Germany ....... 3210878

[51] Int. Cl.$^3$ .................. C01B 31/02; C09C 1/48; D01F 9/14
[52] U.S. Cl. .................. 423/445; 423/447.1; 423/449; 264/29.2; 264/29.7
[58] Field of Search .......... 423/445, 449, 448, 447.1, 423/447.8; 264/29.3, 29.4, 29.7, 29.2

[56] References Cited

U.S. PATENT DOCUMENTS

| | | | |
|---|---|---|---|
| 3,498,929 | 3/1970 | Accountius | 423/449 |
| 3,719,452 | 3/1973 | Accountius | 423/449 |
| 4,251,500 | 2/1981 | Morita et al. | 423/449 |
| 4,353,782 | 10/1982 | Lersmacher | 423/449 |

OTHER PUBLICATIONS

"Chemistry and Physics of Carbon", Ed. by P. L. Walker, Marcel Decker, Inc., New York, (1971), vol. 7, pp. 321–325.

F. Quella, Kunstoffe, vol. 71, No. 6, 1981, pp. 386–388, 1981.

F. Quella, "Thermal-Oxidative Degeneration of Poly(phenylene sulfide) At Application and Processing Temperatures", German Plastics, vol. 71, No. 6, pp. 22 and 23, (1981).

*Primary Examiner*—Edward J. Meros
*Assistant Examiner*—Steven Capella
*Attorney, Agent, or Firm*—Hill, Van Santen, Steadman & Simpson

[57] ABSTRACT

Glass or vitrified carbon is produced by thermal degradation of polyphenylene sulfide or a substituted compound thereof by additions of an oxide of a sulfide-forming metal, such as $Fe_2O_3$, which is added in a weight amount of at least about 1% and preferably about 10%, in order to accelerate the degradation process, and resultant admixture is heated to a temperature above about 150° C. and thereafter the temperature is increased during the course of the reaction. The inventive process is useful for production of chemically resistant glass carbon fibers, glass carbon electrodes, glass carbon containers, etc.

14 Claims, No Drawings

METHOD OF PRODUCING GLASS CARBON

BACKGROUND OF THE INVENTION

1. Field of the Invention

The invention relates to a method of producing glass or vitrified carbon by thermal degradation of aromatic organic compounds having cross-linking property in the thermally degraded state.

2. Prior Art

Glass carbon is produced from various plastics, such as, for example, polyacrylonitrile or polyfurfuryl alcohol through a complicated degradation process (carbonization process) under air and nitrogen at steadily increasing temperatures. In this process, a select plastic is first changed into a desired form, for example fiber, plate or shaped part, and is then thermally degraded to such a degree that the plastic is substantially converted into carbon, which is referred to as glass carbon. During this process, the plastic can not be heated above its melting temperature during the initial degradation phase since otherwise it would loose its shape.

SUMMARY OF THE INVENTION

The invention provides a method for producing glass or vitrified carbon with the use of a plastic whose thermal degradation can be carried out in such a manner that no change of shape occurs.

In accordance with the principles of the invention, vitrified carbon (glass carbon) is produced by admixing pure polyphenylene sulfide (sometimes referred to herein as PPS) or a substituted PPS compound (for sake of simplicity, pure PPS and/or substituted PPS compounds are sometimes referred to herein collectively as PPS materials) with an oxide of a sulfide-forming metal and subjecting the admixture to thermal degradation by heating the admixture to a temperature above about 150° C. and increasing the temperature during the degradation process nearly up to the melting point of polyphenylene sulfide (about 285° C.) or that of the substituted PPS compound.

In certain embodiments of the invention, the temperature at the beginning of the degradation process is set at approximately 200° C. and is increased relatively quickly up to about 280° C. during the course of the reaction and is steadily increased with the elevation of the melting temperature of the resultant cross-linked plastic.

In the practice of the invention, oxides of iron, zinc, manganese, aluminum, silver, copper, chromium and vanadium can be used as accelerators in the thermal degradation of PPS or a substitute compound thereof.

In certain preferred embodiments of the invention, ferric oxide ($Fe_2O_3$) in an amount equal to at least 1% by weight, based on the weight of the PPS material, and preferably about 10%, is added to the PPS material to accelerate the thermal degradation thereof.

In certain other embodiments of the invention, basic aluminum oxide ($Al_2O_3$) is added in a weight proportion of not more than about 0.5%, and preferably about 0.1% by weight of the plastic (PPS material) utilized.

In yet other embodiments of the invention, alkali metal oxides or alkaline earth metal oxides are utilized in a weight proportion in the range from about 1 through 10%, based on the weight of the plastic.

In certain embodiments of the invention, a thermally cleavable inorganic salt is added to the admixture of the PPS material and accelerator, in an amount in the range of about 1%, by weight, based on the weight of the PPS material. In preferred forms of this embodiment, carbonates and bicarbonates of alkali metals or alkaline earth metals are utilized.

DESCRIPTION OF PREFERRED EMBODIMENTS

Synthetic polyphenylene sulfide [a thermoplastic polycondensate having the general formula $(-C_6H_4-S-)_n$ wherein n is a numeral] is particularly suitable for producing glassy or vitrified carbon because of its chemical structure. However, degradation of this plastic occurs very slowly up to its melting temperature of 285° C. so that a degradation thereof under normal conditions (air, atmospheric pressure) is not commercially attractive. An increase of temperature above the melting temperature (melting point) of PPS, leads to deformation. Information concerning the mechanism of thermal degradation of PPS in air can be derived from Dr. F. Quella, "Thermal-Oxidative Degradation of Poly (phenylene sulfide) at Application and Processing Temperatures", *German Plastics*, Vol. 71 (1981) pages 386–388.

Not only is pure PPS a suitable material for thermal degradation because of its cross-linking properties, but substituted PPS compounds, preferably those having at least one substituent in the 2, 3, 5 or 6 positions of PPS are likewise useful. Generally, preferred substituents are selected from the group consisting of Cl, Br, F, $SO_2$; $SO_3H$, SH, $NO_2$ and mixtures thereof. The melting points of substituted PPS compounds generally is below that of pure PPS (285° C.).

Whereas some additives, such as polyvinylcarbazole, retard the degradation process of PPS materials in this temperature range and some salts such as lithium carbonate or sodium carbonate behave indifferently (lithium carbonate was employed during the investigative work by F. Quella above, as an absorbent for volatile sulfur-containing gases released by PPS under heat), it has now been discovered on the basis of the inventive process that metal oxides, particular oxides of sulfide forming metals, significantly accelerate the degradation of PPS materials. Even with a degradation temperature of 200° C., an addition of, for example, 1% $Fe_2O_3$ (by weight, on the basis of the weight of PPS material) to the PPS material already accelerates the degradation rate by a factor of 2 (as measured by the development of volatile compounds in a sulfur gas detection means). Whereas the development of sulfur-containing gases constantly increases with increasing concentrations of added $Fe_2O_3$, an opposite tendency is observable with additions of $Al_2O_3$ (basic). Thus, an addition of 0.1% $Al_2O_3$ effects an acceleration of the degradation process at 200° C. by a factor of 1.5 but with an addition of 1% of $Al_2O_3$, practically no acceleration is identifiable.

The discovered effect of oxides of sulfide-forming metals, such as $Fe_2O_3$, on PPS materials can be well-exploited for producing glassy carbon articles. When the degradation temperature is increased to approximately 280° C., i.e., just below the melting temperature of PPS (285° C.) and the $Fe_2O_3$ concentration is increased to approximately 10% or more, then the degradation rate can be increased by several powers of ten, in accordance with an approximate validity of the Arrhenius law ($k = k_o - E_A/RT$ wherein k and $k_o$ are reaction rate constants at various temperatures; $E_A$ is the activation energy; R is the gas constant and T is the temperature). Customarily, this relation signifies that, for example, with a temperature increase of 10°, the reaction rate is doubled. As a result of the increasing cross-linkage which occurs during the degradation reaction, the degradation temperature can be slowly increased, even far above the original reaction temperature of 280° C. without deformation occurring.

The degradation accelerating additives utilized in the practice of the invention are hardly of consequence for electrical use purposes, since it is thereby principly a matter of a surface phenomena. Further, mechanical properties only change with substantially larger amounts of added metal oxide; for example, embrittlement may occur with a too large of an oxide addition during production of glassy carbon fibers. In instances where containers are formed from glassy carbon produced in accordance with the principles of the invention, a wash-out or depletion of, for example, $Fe_2O_3$ is not disruptive to the structure in many instances. Further, one can, if desired or necessary in a given product, use $Al_2O_3$, even though the acceleration of the degradation process is not as great with this additive as with $Fe_2O_3$. In addition to iron oxide (particularly $Fe_2O_3$) and aluminum oxide (basic $Al_2O_3$), the invention can also be practiced with the use of oxides of zinc, manganese, silver, copper, vanadium or chromium. However, the acceleration properties of the foregoing metal oxides are not as greatly pronounced as those of $Fe_2O_3$. Other sulfide-forming metal oxides, such as those of lead, cadmium or nickel also function as accelerants but must be used with extreme care because of toxicological reasons. Oxides of boron and phosphorus are generally not suitable because of their great solubility.

Alkali metal oxides and alkaline earth metal oxides also have an accelerating effect on the degradation process of PPS and substituted PPS compounds, but are readily soluble. However, this effect is advantageous in the practice of the invention for forming certain products, for example, when electrodes having a porous (i.e., large) surface area are to be produced in accordance with the principles of the invention, because after formation, the alkali or alkaline ions can be dissolved out of the formed article.

Structures or work pieces which are converted from plastics into glassy carbon are generally subjected to large shrinkage. This effect can be countered when, in accordance with an exemplary embodiment of the invention, a relatively small amount (approximately 1% by weight, based on a weight of PPS material) of a thermally decomposable inorganic salt, for example a carbonate or a bicarbonate of an alkali metal or alkaline earth metal is added to the admixture of PPS material and accelerant. When the resultant admixture is heated during the degradation process, this material gives off $CO_2$, which opposes shrinkage. The reaction can thus be conducted such that the plastic is first carbonized for some time with a rising temperature and, when the plastic article has solidified (via cross-linkage), the temperature can be raised to the degradation temperature of the inorganic carbonate (for example between 300° and 400° C.) and depending on the duration of time and existing viscosity, the inorganic salt then effervesces.

In the practice of the invention, the PPS materials are preferably obtained in granular form and admixed with accelerants and other select materials, which may also be in granular form. The resultant substantially uniform admixture is then shaped into a desired form, for example, fibers, electrodes, containers, etc., as by pressure molding or the like and then subjected to heat (degradation process) in a suitable furnace. During the degradation process, the PPS material undergoes constant chemical change via cross-linkage and thus constantly changes its melting point. For example, during degradation of Ryton R6 (a registered trademark for pure PPS) for two hours at each of 220°, 240° and 260° C., the melting point raises from approximately 280° C. to 295° C. and this effect can be enlarged as desired. The attained cross-linkage in the PPS material is measurable through impact tests or through determination of weight loss of sulfur compounds, under the condition that the cross-linkage runs according to a program (the cross-linkage mechanism is known in the art).

Expediently, the degradation reaction occurs in a temperature-controllable furnace having a temperature range extending up to approximately 1100° C. and which may be provided with a protective gas atmosphere. If desired, up to temperatures of about 350° C., the degradation process can occur in air.

Admixture of PPS material and accelerant and/or shrinkage-avoiding additive can be formed into desired article by various known work steps, such as pressing or shaping.

As is apparent from the foregoing specification, the present invention is susceptible of being embodied with various alterations and modifications which may differ particularly from those that have been described in the precedings specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. A method for producing glass carbon by thermal degradation of aromatic organic compounds which exhibit cross-linking properties upon thermal degradation, comprising:
   admixing a polyphenylene sulfide material with an oxide of a sulfide-forming metal; and
   subjecting the resultant admixture to thermal degradation by heating said admixture to a temperature above about 150° C. and increasing the temperature during the degradation process nearly up to the melting point of the polyphenylene sulfide material.

2. A method as defined in claim 1 wherein the temperature at the beginning of the degradation process is set at approximately 200° C. and is increased relatively quickly up to 280° C. during the course of the reaction and is steadily increased with the elevation of the melting temperature of the resultant cross-linked polyphenylene sulfide material.

3. A method as defined in claim 1 wherein the sulfide-forming metal oxide is an oxide selected from the group consisting of iron, zinc, manganese, aluminum, silver, copper, chromium and vanadium.

4. A method as defined in claim 1 wherein said sulfide-forming metal oxide is ferric oxide ($Fe_2O_3$) which is added in an amount equal to at least 1% by weight, based on the weight of said polyphenylene sulfide material.

5. A method as defined in claim 4 wherein the amount of ferric trioxide is about 10% by weight of the polyphenylene sulfide material.

6. A method as defined in claim 1 wherein the sulfide-forming metal oxide is basic aluminum oxide ($Al_2O_3$), which is added in a weight amount of not more than about 0.5% by weight, based upon the weight of the polyphenylene sulfide material.

7. A method as defined in claim 6 wherein the weight of added aluminum oxide is about 0.1% by weight, based upon the weight of the polyphenylene sulfide material.

8. A method as defined in claim 1 wherein the sulfide-forming metal oxide is an alkali metal oxide or an alkaline earth metal oxide, which is added in a weight amount in the range from about 1 through 10% by weight, based upon the weight of the polyphenylene sulfide material.

9. A method as defined in claim 1 wherein a thermally decomposable inorganic salt is added to the admixture of the polyphenylene sulfide material and sulfide-forming metal oxide, in a weight amount in the range of about 1% by weight, based upon the weight of the polyphenylene sulfide material.

10. A method as defined in claim 9 wherein carbonates and bicarbonates of alkali metal or alkaline earth metal comprise the inorganic salts.

11. A method as defined in claim 1 wherein said polyphenylene sulfide material is pure polyphenylene sulfide.

12. A method as defined in claim 1 wherein said polyphenylene sulfide material is a substituted polyphenylene sulfide having at least one substituent in the 2, 3, 5 or 6 positions of polyphenylene sulfide, said substituent being selected from the group consisting of Cl, Br, F, $SO_2$, $SO_3H$, SH, $NO_2$ and mixtures thereof.

13. A method of producing an article composed of glass carbon, comprising:
  admixing a polyphenylene sulfide material with about 0.1% to 10% by weight, based on the weight of said sulfide material, of an oxide of a sulfide-forming metal;
  forming a desired article from said admixture;
  subjecting the formed article to heat at a temperature above about 150° C. whereby said polyphenylene sulfide material undergoes a thermal degradation process and undergoes crosslinkage to initiate formation of glass carbon; and
  increasing the temperature during said thermal degradation process nearly up to the melting point of the resultant cross-linked polyphenylene sulfide material.

14. A method as defined in claim 13 wherein a thermally decomposable inorganic salt is added in a range of about 1% by weight, based on the weight of the polyphenylene sulfide material, to said admixture of polyphenylene sulfide material and sulfide-forming metal oxide prior to formation of a desired article.

* * * * *